United States Patent
Nakazaki et al.

(10) Patent No.: US 12,462,007 B2
(45) Date of Patent: Nov. 4, 2025

(54) SYSTEM AND METHOD FOR PREVENTING FRAUDULENT DEVICE ACCESS USING MULTI-AREA BIOMETRIC AND VITAL SIGN AUTHENTICATION

(71) Applicant: Hitachi, Ltd., Tokyo (JP)

(72) Inventors: Keiichiro Nakazaki, Tokyo (JP); Naoto Miura, Tokyo (JP); Yusuke Matsuda, Tokyo (JP); Akio Nagasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 133 days.

(21) Appl. No.: 18/024,567

(22) PCT Filed: Aug. 25, 2021

(86) PCT No.: PCT/JP2021/031253
§ 371 (c)(1),
(2) Date: Mar. 3, 2023

(87) PCT Pub. No.: WO2022/180890
PCT Pub. Date: Sep. 1, 2022

(65) Prior Publication Data
US 2023/0359717 A1    Nov. 9, 2023

(30) Foreign Application Priority Data

Feb. 24, 2021   (JP) ................. 2021-026956

(51) Int. Cl.
*G06F 21/32*   (2013.01)
*G06V 40/10*   (2022.01)
(Continued)

(52) U.S. Cl.
CPC .......... *G06F 21/32* (2013.01); *G06V 40/1365* (2022.01); *G06V 40/15* (2022.01);
(Continued)

(58) Field of Classification Search
None
See application file for complete search history.

(56) References Cited

U.S. PATENT DOCUMENTS

| | | |
|---|---|---|
| 2018/0220939 A1 | 8/2018 | Matsuo et al. |
| 2019/0076064 A1 | 3/2019 | Tahara et al. |

(Continued)

FOREIGN PATENT DOCUMENTS

| | | |
|---|---|---|
| JP | 2017-010210 A | 1/2017 |
| JP | 2017-091276 A | 5/2017 |

(Continued)

OTHER PUBLICATIONS

Extended European Search Report issued on Dec. 3, 2025 for European Patent Application No. 21927986.6.

(Continued)

*Primary Examiner* — William J. Goodchild
(74) *Attorney, Agent, or Firm* — Volpe Koenig

(57) ABSTRACT

Authentication is performed by confirming that the true operator presents his/her own biometric authentication information at a common portable information terminal. The biometric authentication system has an image capture unit that acquires first and second image data of different biometric areas of an operator during a predetermined period, a display that displays a guide to guide the operator to the location of the biometric area in order to capture different biometric areas of the operator, and a memory that stores biometric authentication information of the operator in advance. Furthermore, the first vital information and the second vital information are extracted from the image data of the different biometric areas, respectively, the identity of the operator is determined based on the first vital informa-
(Continued)

tion and the second vital information, and if the identity of the operator is confirmed, the biometric authentication is performed.

11 Claims, 20 Drawing Sheets

(51) Int. Cl.
*G06V 40/12* (2022.01)
*G06V 40/16* (2022.01)
*G06V 40/60* (2022.01)
*H04N 23/90* (2023.01)
*G06V 40/40* (2022.01)

(52) U.S. Cl.
CPC ............ *G06V 40/172* (2022.01); *G06V 40/67* (2022.01); *H04N 23/90* (2023.01); *G06V 40/40* (2022.01)

(56) References Cited

U.S. PATENT DOCUMENTS

2019/0087621 A1\* 3/2019 Khuri-Yakub ........ G06F 3/0436
2023/0316813 A1\* 10/2023 Walch .................... G06V 40/16
 382/115

FOREIGN PATENT DOCUMENTS

| JP | 2019-028660 A | 2/2019 |
| JP | 2019-197426 A | 11/2019 |
| JP | 2020-057275 A | 4/2020 |
| WO | 2018/021215 A | 2/2018 |
| WO | 2020/218491 A1 | 10/2020 |

OTHER PUBLICATIONS

Chen, Y., "Your face your heart: Secure mobile face authentication with photoplethysmograms," IEEE INFOCOM 2017—IEEE Conference on Computer Communications, Atlanta, GA, USA, (2017).

\* cited by examiner

SYSTEM AND METHOD FOR PREVENTING FRAUDULENT DEVICE ACCESS USING MULTI-AREA BIOMETRIC AND VITAL SIGN AUTHENTICATION

TECHNICAL FIELD

This invention relates to a technique for authenticating an individual using a living body.

BACKGROUND ART

Traditionally, memory authentication such as ID (Identification) and PW (Password), and object authentication such as physical locks or IC (Integrated Circuit) cards have been widely used as means of personal authentication for access control such as access control, attendance ticking, and computer login.

However, these forms of authentication carry the risk of forgetting or losing the device. In contrast, biometric authentication has been used in recent years without these risks. Biometric authentication uses a device equipped with a sensor to read biometric authentication information, and is used to control access to personal computers (PCs), bank ATMs (Automated Teller Machines), room entrances, lockers, and other devices. In particular, with the recent spread of portable information terminals such as smartphones and tablets, biometric authentication can be easily performed on portable information terminals in an increasing number of cases. On the other hand, biometric authentication has become problematic when someone impersonates a person by presenting a photo or display of the person's image or an object that imitates the person's body. Therefore, in order for users to use biometric authentication safely and securely, it is necessary to take measures to prevent such impersonation.

Patent document 1 discloses a technique for extracting vital information from the face area of a person in time-continuous captured images obtained from an imaging device, and based on the vital information, preventing fraud by means of photographs, etc. of that person.

CITATION LIST

Patent Document

Patent Document 1 JP 2017-10210 A

SUMMARY OF THE INVENTION

Problems to be Solved by the Invention

The problem with Patent Document 1 is that by presenting a video showing a person's reflection on a display to an authentication terminal, it is easy for someone else to impersonate that person and perform biometric authentication.

Therefore, the purpose of the present invention is to provide a biometric authentication system and a method to authenticate an operator by confirming that the operator presents his/her own biometric authentication information on a common portable information terminal.

Solutions to Problems

The biometric authentication system comprises an image capturing unit being configured to acquire a first image data and a second image data of different biological areas or regions, hereinafter areas, of an operator during a predetermined period, a display displaying a location guidance of the biological area to the operator for capturing different biological areas of the operator, a memory stores biometric authentication information of the operator in advance, and an authentication processor being configured to extract a first vital information and a second vital information from the first image data and the second image data of the different of the biological areas, respectively, determine an identity of the operator based on the first and second vital information, if the identity of the operator is confirmed, extract a biometric information of the operator from the second image data, and perform biometric authentication based on the extracted biometric information and the biometric information stored in the memory unit.

Effects of the Invention

According to the present invention, if the identity of multiple vital information obtained from multiple different biological areas or regions acquired by a general portable terminal equipped with an image capture unit that acquires image data is confirmed, the operator can perform biometric authentication using his or her own biometric authentication information.

MODE FOR CARRYING OUT THE INVENTION

In the following description, one or more processors constitute an authentication processor. The at least one processor is typically a microprocessor such as a CPU (Central Processing Unit), but may also be another type of processor such as a GPU (Graphics Processing Unit). The at least one processor may be single-core or multi-core.

The at least one processor is also a hardware circuit (e.g., Field-Programmable Gate Array (FPGA) or Application Specific Integrated Circuit (ASIC)) that performs part or all of the processing in a broad sense.

In the following description, the "program" may be used as the subject of the process, but since the program, when executed by a processor, performs a defined process while using memory and/or interface(s), etc., as appropriate, the subject of the process may be the processor (or the subject of the processing may be the processor (or a device such as a controller with a processor).

The program may be installed in a device such as a computer, or may be on a (e.g., non-transitory) recording medium that can be read by, for example, a program distribution server or a computer. In the following description, two or more programs may be realized as one program, or one program may be realized as two or more programs.

The biometric authentication system may be a distributed system consisting of one or more (typically multiple) physical devices.

In the following explanations, reference codes (or common codes among reference codes) may be used when elements of the same type are described without distinguishing between them, and element identification numbers (or reference codes) may be used when elements of the same type are described separately.

Various embodiments or examples of the invention are described below with reference to the accompanying drawings. Although the accompanying drawings show specific examples in accordance with the principles of the invention, they are for the understanding of the invention and are not to be used to interpret the invention in a limiting manner.

Embodiment 1

Figure 1:
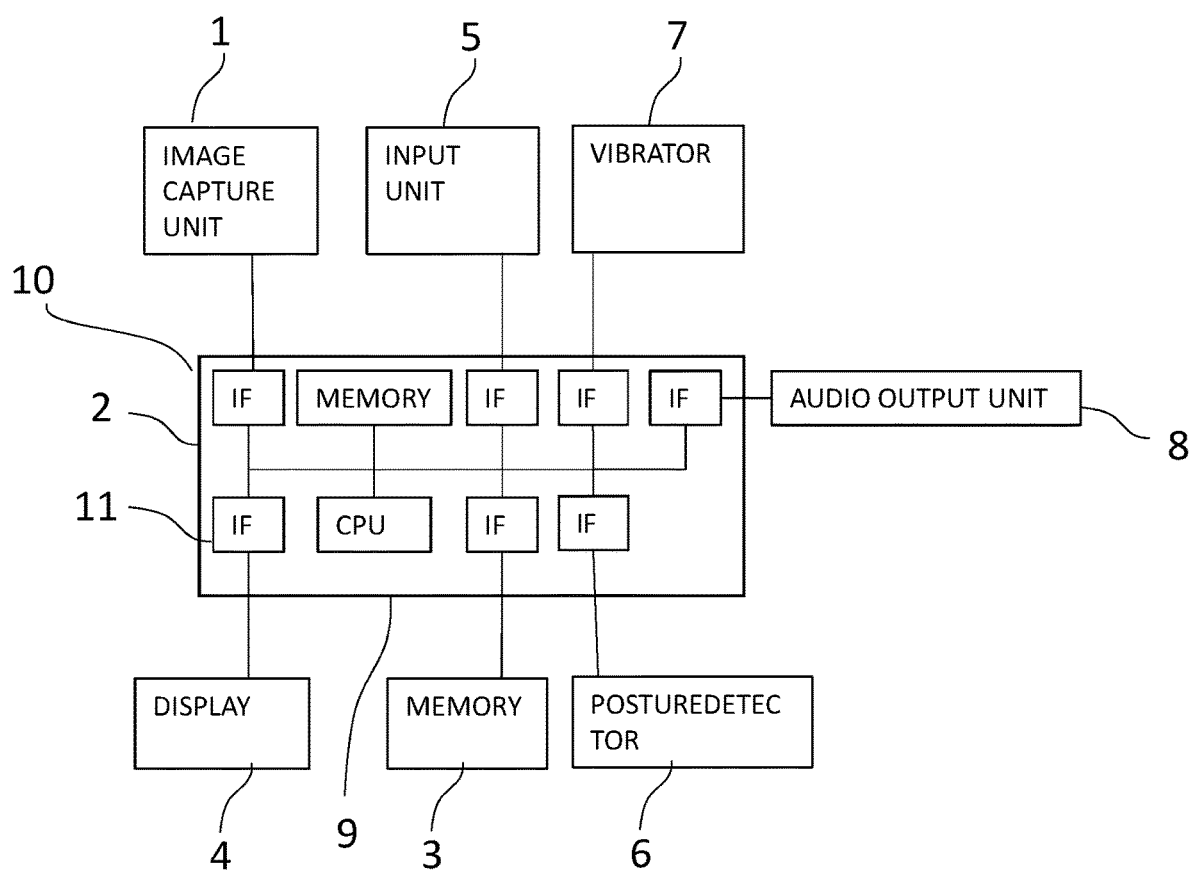
FIG. 1 shows an example of a block diagram of the entire biometric authentication system in Embodiment 1.

FIG. 1 shows an example of a block diagram of the entire biometric authentication system of Embodiment 1.

In the embodiments, the biometric authentication system is described as a general portable terminal such as a smartphone or tablet, i.e., authentication terminal 100. It goes without saying that the invention may be configured not only as an authentication terminal 100 but also as a device with all or some of the components shown in FIG. 1 mounted in a housing. In that case, the biometric authentication system may be a biometric authentication device including the authentication process. Alternatively, the authentication process may be performed outside the authentication terminal, and the authentication terminal may be configured as an authentication terminal specialized for acquiring biometric images.

The authentication terminal 100 of Embodiment 1 includes an image capture unit 1, an authentication processing unit 2, a memory 3, a display 4, an input unit 5, a posture detector 6 and a vibrator 7, an audio output 8.

Image capture unit 1 is, for example, a camera, which acquires images containing biometric authentication information by capturing the subject (operator of the authentication terminal), and inputs the acquired images to authentication processing unit 2. The camera, for example, has three types of photosensors that are sensitive to blue (B), green (G), and red (R), respectively, and these are arranged in a grid pattern for each pixel. The spectral sensitivity of each photosensitive element has a peak sensitivity around 480 nm for blue, 550 nm for green, and 620 nm for red, for example. By photographing with the camera, the spatial luminance distribution of light with peaks of sensitivity at each of the three different wavelengths can be obtained.

Authentication processing unit 2 generates biometric authentication information by image processing the image input from image capture unit 1, and performs authentication processing based on the biometric authentication information. The authentication processing unit may be configured by including image capture unit 1 in the image processing function of authentication processing unit 2. In either case, authentication processing unit 2 is equipped with an image processing function.

The authentication processing unit 2 includes a central processing unit (CPU: Central Processing Unit) 9, a memory 10, and various interfaces 11 (IF: Interface). The memory 10 stores the program executed by CPU 9. In addition, the memory 10 temporarily stores images input from image capture unit 1. Interface 11 connects authentication processing unit 2 to external devices. Specifically, the interface 11 is connected to the image capture unit 1, memory 3, display 4, input unit 5, posture detector 6, vibrator 7, and audio output 8.

Figure 2:
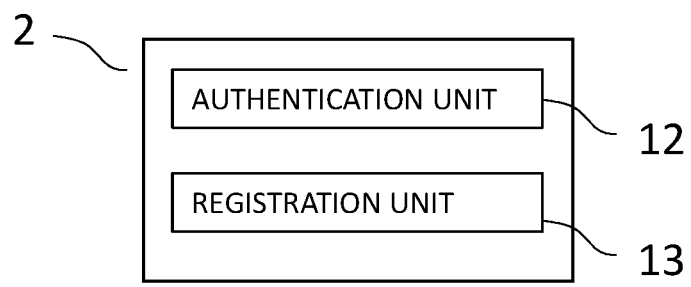
FIG. 2 shows an example of the functional block diagram of authentication processing unit 2 in Embodiment 1.

FIG. 2 shows an example of the functional block diagram of authentication processing unit 2 in Embodiment 1.

The authentication processing unit 2 is equipped with an authentication unit 12 and a registration unit 13. The authentication unit 12 processes the biometric authentication information obtained by image processing of the image input from the image capture unit 1 (hereinafter referred to as input data) and the biometric authentication information registered in advance in memory 3 (hereinafter referred to as biometric authentication information).

Returning to FIG. 1, the memory 3 stores user registration data in advance. The registration data (biometric authentication information) is information for matching users, such as images of finger vein patterns and features such as nose, eyes, and mouth that can be used in face recognition. Usually, the finger vein pattern image is an image of blood vessels (finger veins) mainly distributed under the skin on the palm side of the finger as a dark shadow pattern.

The display 4 is, for example, a display and outputs information received from authentication processing unit 2 in the form of video. In the following description, display 4 may be referred to as display 4. The display 4 displays a guide to guide the operator to one of the biometric areas to capture different biometric areas of the operator. The input unit 5 may be a physical keyboard with buttons that are physically pressed to input letters and numbers, or it may be a virtual keyboard in which an image that imitates a physical keyboard is displayed on the display 4 and a pointing device such as a mouse, touch panel, or pen is used to press the buttons on the image that imitates the keyboard. In the following description, Input unit 5 may be referred to as keyboard 5 or button 5.

Posture detector 6 is, for example, a gyro sensor, an acceleration sensor, a geomagnetic sensor, etc., and detects posture information such as the movement and orientation of part or all of the authentication terminal 100, and inputs it to the authentication processing unit 2. Audio output 8 is a speaker, for example, that outputs audio information received from authentication processing unit 2. In the following description, audio output 8 may be referred to as speaker 8.

Figure 3:
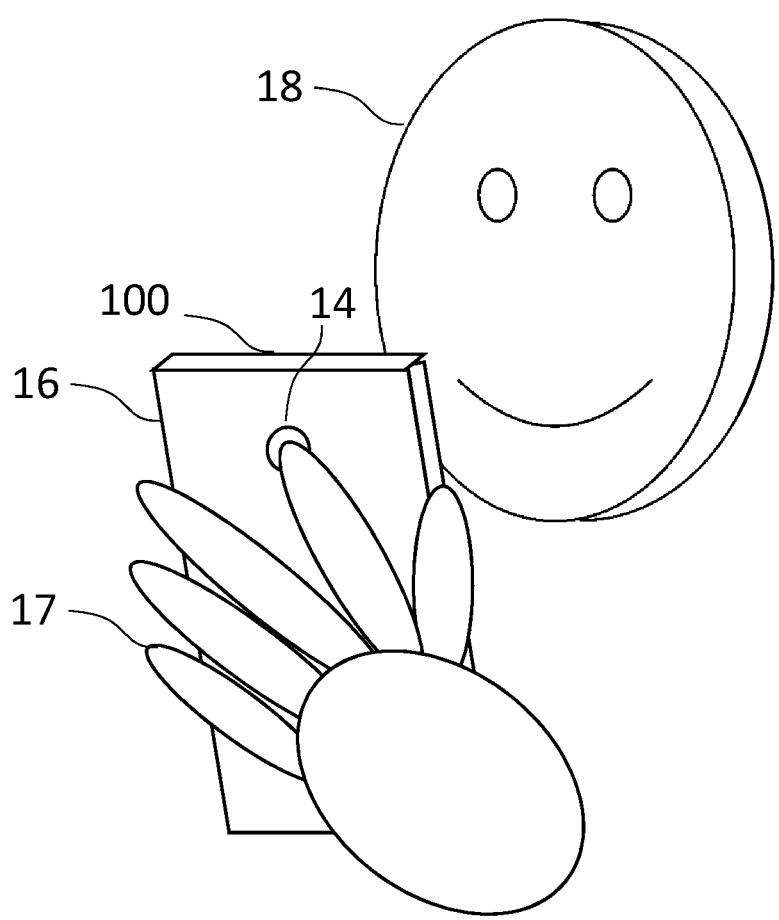
FIG. 3 shows an example of the authentication of Embodiment 1 observed from the rear side of the authentication terminal.

FIG. 3 shows an example of the authentication of Embodiment 1 observed from the rear side of the authentication terminal 100.

Figure 4:
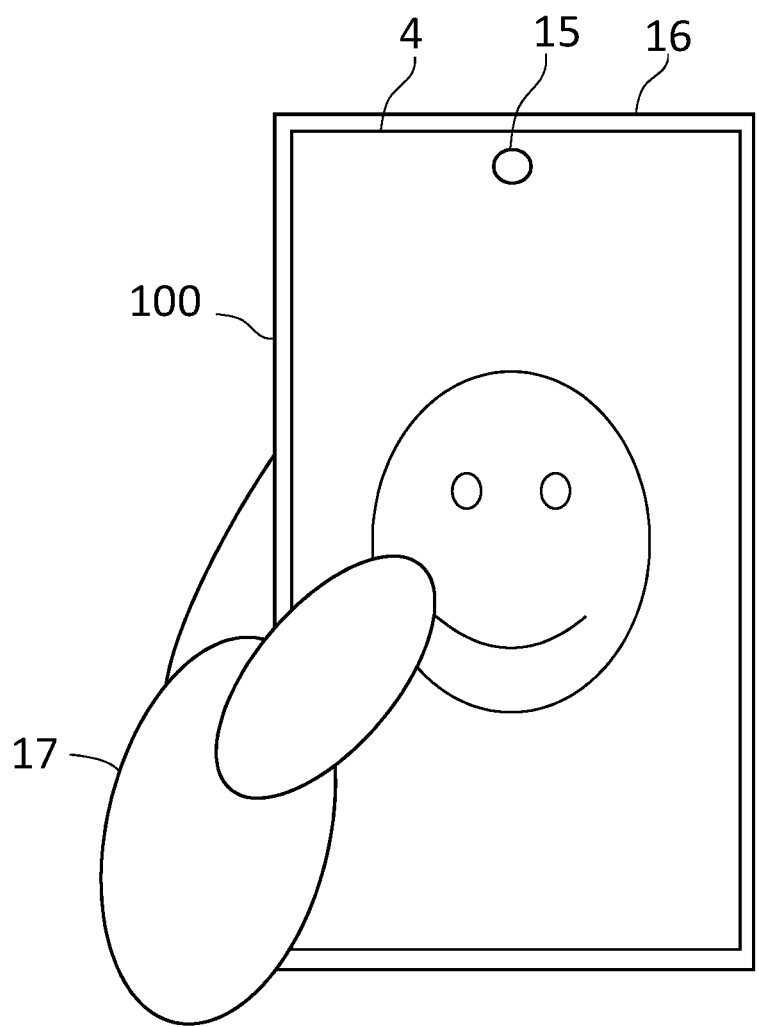
FIG. 4 shows an example of the authentication of Embodiment 1 observed from the front side of the authentication terminal.

FIG. 4 shows an example of the authentication of Embodiment 1 observed from the front side of the authentication terminal 100.

In Embodiment 1, biometric authentication is performed using an authentication terminal 100 equipped with a rear camera 14, a front camera 15, and a display 4 outside housing 16, after confirming that the operator of the authentication terminal is the person to be authenticated, as assumed by the biometric authentication system. The biometric authentication is performed after confirming that the operator of the authentication terminal is the person to be authenticated in the biometric authentication system.

As shown in FIG. 3 and FIG. 4, the operator of the authentication terminal presents finger 17, which grasps the authentication terminal 100, and face 18, which confirms the screen of the terminal, according to the instructions displayed on the display 4 described below. The authentication terminal 100 takes a picture of finger 17 with the rear camera 14 located on the back of the housing 16 of the authentication terminal 100, and takes a picture of face 18 with the front camera 15 located on the front of the housing 16 of the authentication terminal 100. Vital information A is extracted from the image obtained from the rear camera 14, and vital information B of the operator is extracted from the image obtained from the front camera 15.

The vital information A extracted from the image of the rear camera 14 is, for example, the pulse wave of the hand or finger 17 and the vital information B obtained from the front camera 15 is, for example, the pulse wave of the face 18. The biometric authentication information extracted from the image of the front camera 15 is, for example, the features of the nose, eyes, mouth, etc. of the face 18 used in face recognition technology.

In Embodiment 1, the operator impersonation can be prevented by confirming that the vital information such as pulse wave acquired by the rear camera 14 and front camera 15 over a predetermined period originates from the same person. After confirming the identity of the operator, biometric authentication can be performed using the biometric authentication information presented by the operator of the authentication terminal. The predetermined period means that vital information A and B are acquired by the rear camera 14 and front camera 15 at the same timing. The same timing means that in addition to acquiring vital information A and B at the same time, they may be acquired at different times during the period in which this authentication process is performed. Thus, the period during which two vital information is acquired for authentication is called the authentication period, and when biometric authentication information is registered, it is called the registration period. The authentication and enrollment periods are predetermined periods of time and can be set to any time, for example, 10 seconds.

Figure 5:
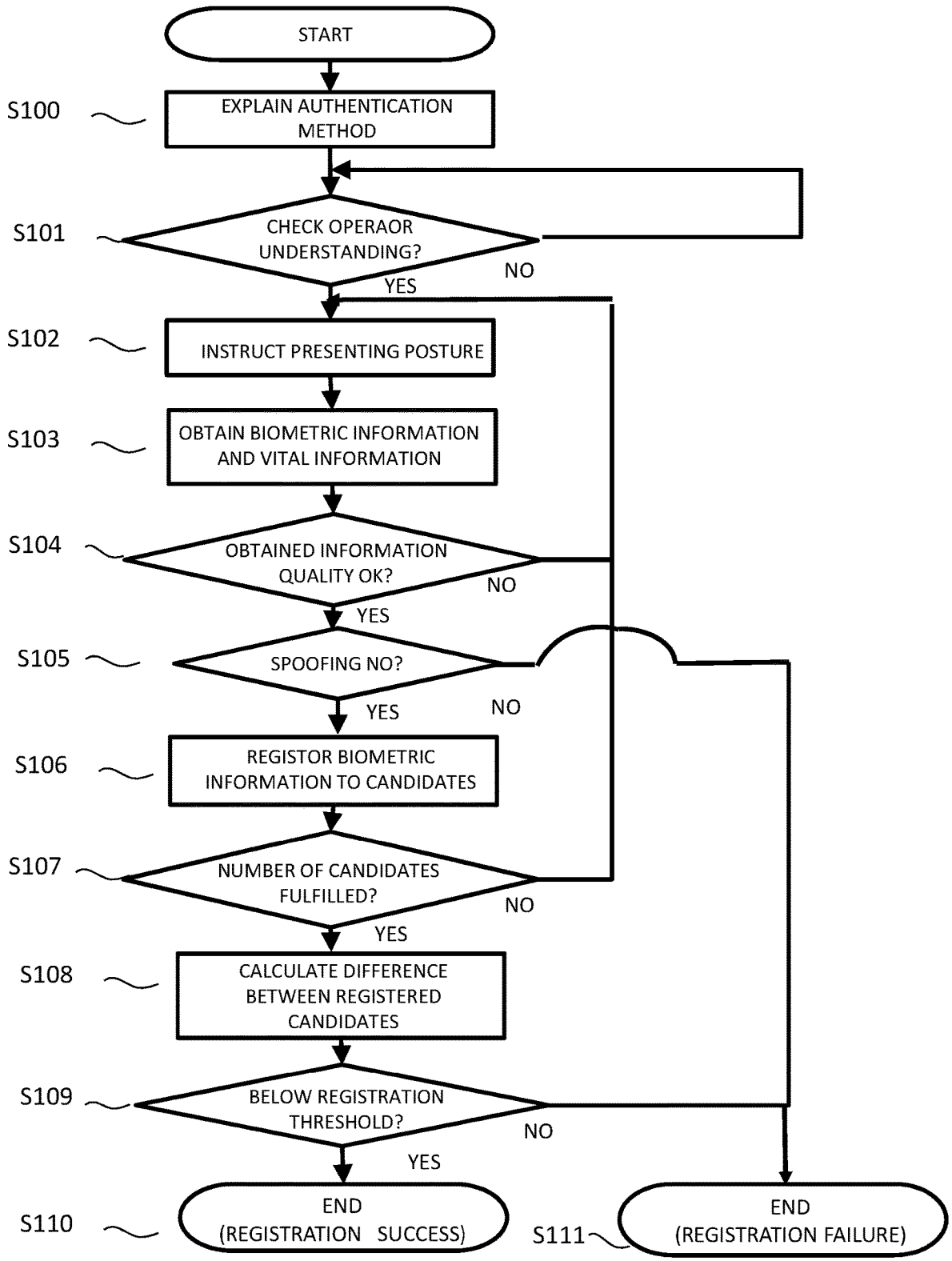
FIG. 5 shows a flowchart of the registration process in Embodiment 1.

FIG. 5 is a flowchart showing the process at the time of registration at the authentication terminal 100 in Embodiment 1. The process shown in FIG. 5 is processed under the control of authentication processing unit 2.

First, the authentication terminal 100 explains the authentication method to the operator of the authentication terminal 100 using the display 4 and speaker 8 (S100).

Next, the authentication terminal 100 checks whether the operator understands the explanation of the authentication method (S100) using input unit 5 and posture detector 6 (S101).

Next, the authentication terminal 100 displays, on the display 4, an image imitating a living body that serves as a sample of the presentation of the biometric part, biometric authentication information extracted from the video or animation obtained from the image capture unit 1 described below, and text indicating a specific presentation posture (S102).

Next, the authentication terminal 100 uses the rear camera 14 and front camera 15, which are image capture unit 1, to capture the operator's body part during the registration period and obtains vital information and biometric authentication information from the obtained video (S103). In other words, vital information such as pulse wave is acquired from the rear camera 14 and front camera 15, and biometric authentication information, which are feature values such as nose, mouth, and eyes used in face recognition technology, is acquired from the front camera 15.

Next, authentication processing unit 2 determines whether the quality of the vital information extracted from the video acquired by the rear camera 14 and front camera 15 and the biometric authentication information extracted from the video acquired by the front camera 15 is appropriate (S104). If the quality is judged to be low and not appropriate, the presentation posture is instructed to increase the quality (S102), and the biometric authentication information acquisition (S103) is redone. If the quality is judged to be high and appropriate, proceed to the next process.

Next, authentication processing unit 2 determines whether or not another person is impersonating the operator (S105) based on the acquired face 18 and the video taken of finger 17. Determining whether there is impersonation (S105) is a process to confirm the identity of the operator. Specifically, vital information A and vital information B acquired by the rear camera 14 and front camera 15, respectively, are stored in memory 10. Then, the vital information A and B stored in memory 10 are compared by authentication unit 12. For example, the amplitude, period, phase, etc. of vital information A and B, which are simultaneously acquired from different biological sites, are calculated respectively. If these vital information were obtained from the same person, the difference in the cycle corresponding to the heart rate is sufficiently small between vital information A and B to determine that there is no spoofing.

If the cycles are significantly different, it is determined that vital information A and vital information B were collected by different persons and that the operator is impersonating the biometric subject. After the determination of impersonation, the vital information A and B stored in memory 10 are deleted from memory 10.

If it is determined that there is spoofing by another person, a message indicating that registration failed is displayed on the display 4, and the registration process is terminated (S111). If it is determined that there is no spoofing by others, proceed to the next process.

Next, authentication processing unit 2 temporarily holds the extracted biometric authentication information data in memory 10 as a candidate for enrollment (S106).

Next, authentication processing unit 2 checks whether the number of registration candidate data held in memory 10 is sufficient to the preset number (S107). If the number of candidate registration data is not sufficient, the process returns to the presentation posture instruction (S102) and continues shooting. If the number of registration candidate data is satisfied, proceed to the next process.

Next, authentication processing unit 2 calculates the degree of difference between the candidate enrollment data (between multiple biometric identifiers) added in step S106 (S108).

Next, authentication processing unit 2 checks whether the calculated discrepancy is below the pre-set registration threshold (S109). If it is above the threshold, it indicates on the display 4 that registration has failed, discards the registration candidate data temporarily stored in memory 10, and terminates the registration process (S111). If the value is below the threshold, the display 4 indicates that the registration was successful, the registration candidate data temporarily held in memory 10 is saved in memory 3, and the registration process is completed (S110).

In memory 3, biometric authentication information of the same operator is stored in association with the ID that uniquely identifies the operator. Therefore, in the explanation of the authentication method in step S100, the operator may be instructed to enter the ID.

Figure 6:
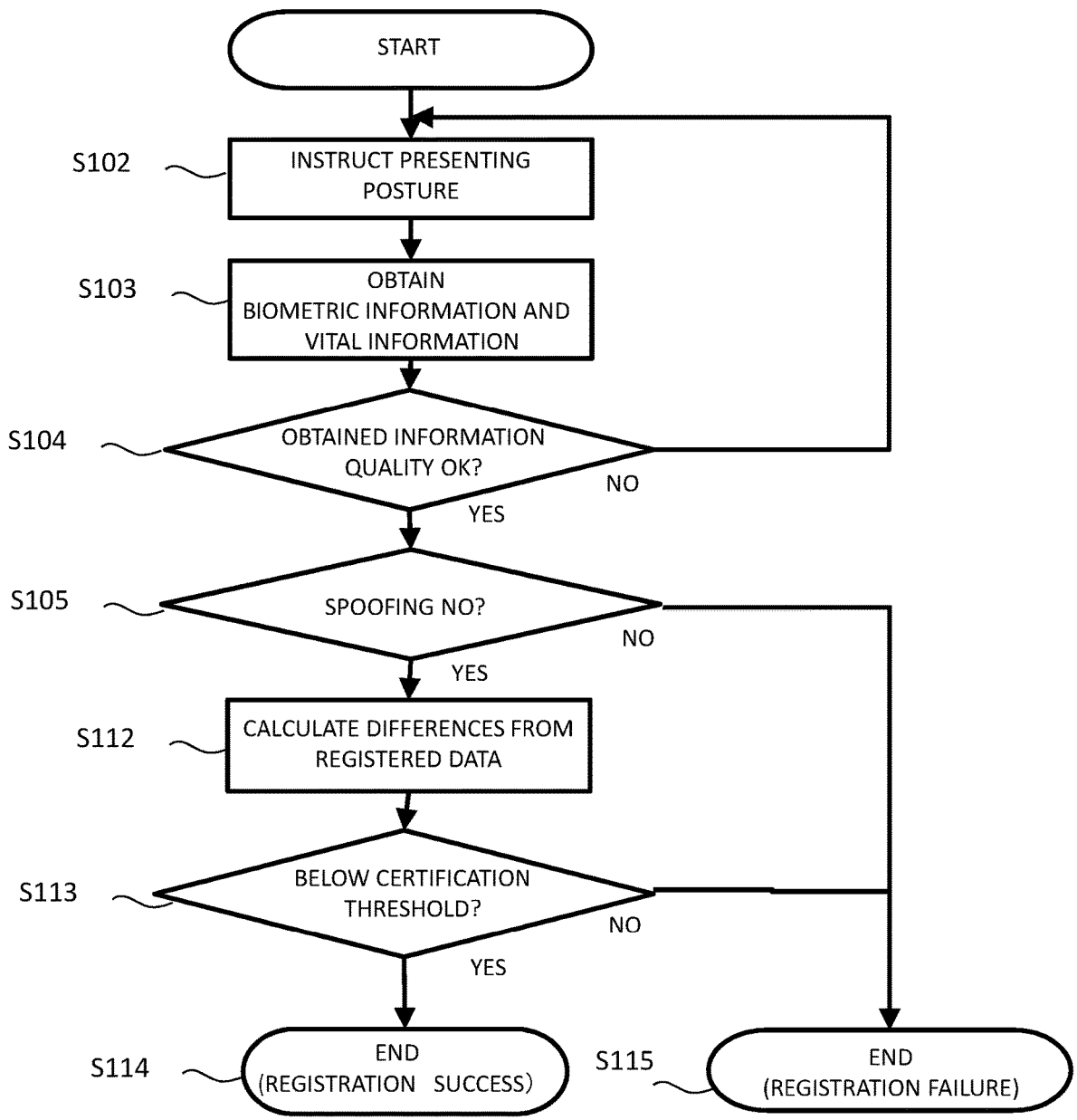
FIG. 6 is a flowchart showing the process during authentication in Embodiment 1.

FIG. 6 is a flowchart showing the processing during authentication of the authentication terminal 100 in Embodiment 1. The process shown in FIG. 6 is handled under the control of authentication processing unit 2.

Among the process flows during authentication, the presentation posture instruction (S102), acquisition of vital and biometric authentication information (S103), quality judgment of acquired information (S104), and judgment as to whether or not impersonation occurs (S105) are identical to the process flow during registration shown in FIG. 5.

In acquiring vital and biometric authentication information in step S103, the images of finger 17 and face 18 of the operator of the authentication terminal 100 are acquired by the two cameras of the image capture unit 1 of the authentication terminal 100, rear camera 14 and front camera 15, and the same vital information A and B are acquired from the different images at the same timing. The same timing means that vital information A and vital information B may be acquired at the same time, or at different times during the period in which this authentication process is being performed. Thus, the period during which two vital information is acquired for authentication is called the authentication period. The authentication period is a predetermined period and can be set to any time, for example, 10 seconds.

After the spoofing presence/absence judgment (S105), authentication processing unit 2 calculates the degree of difference between the biometric authentication information extracted from the image captured by image capture unit 1 and the biometric authentication information of the operator that is pre-registered in memory 3 (S112). For this purpose, in the presentation posture instruction (S102), the ID of the operator is instructed to be input, the input of the operator's ID is accepted, and the biometric authentication information registered in correspondence with the operator's ID is read from memory 3.

Next, authentication processing unit 2 checks whether the calculated discrepancy is below the pre-set authentication threshold (S113). If it is above the threshold, the display 4 indicates that authentication failed, and the authentication process is terminated (S115). If it is below the threshold, the display 4 indicates that the authentication was successful, and the authentication process ends (S114).

Figure 7:
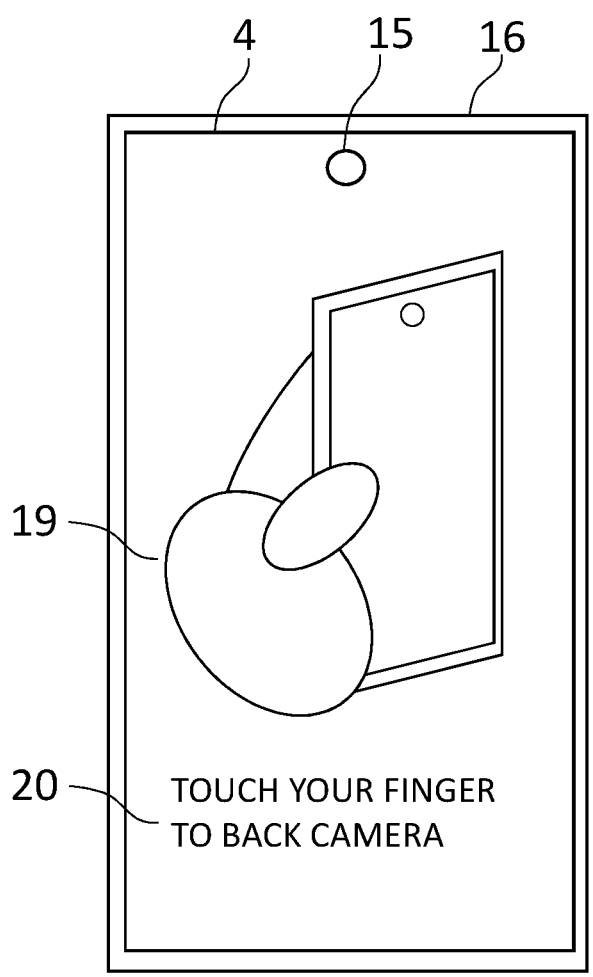
FIG. 7 shows an example of a screen display guiding the presentation of a biometric site to the image capture unit located on the back of the authentication terminal in Embodiment 1.

FIG. 7 shows an example of a screen display of a guide guiding the presentation of the biometric site to the rear camera 14 of the authentication terminal 100 of Embodiment 1 in step S100.

Figure 8:
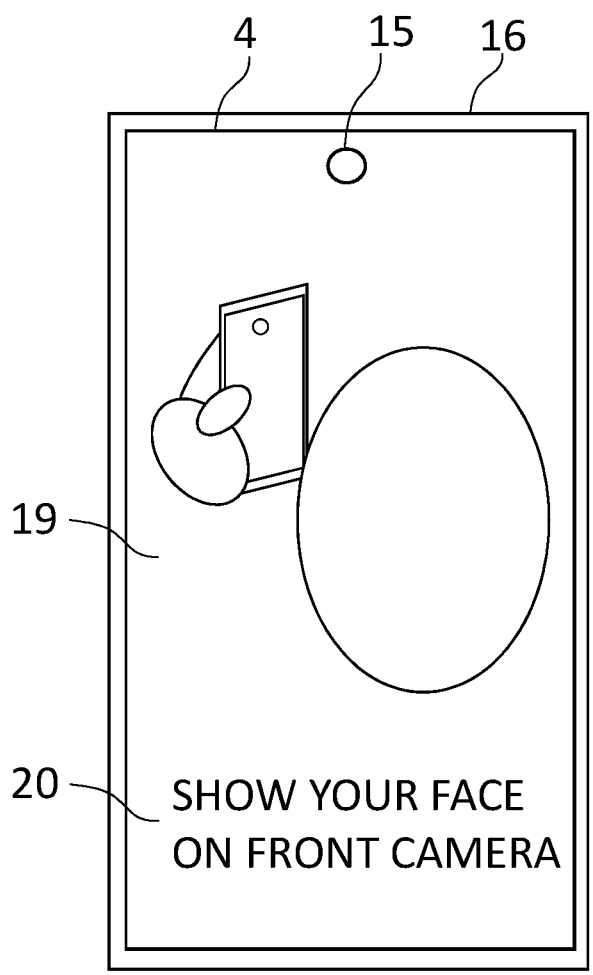
FIG. 8 shows an example of a screen display guiding the presentation of a biometric site to the image capture unit placed in front of the authentication terminal in Embodiment 1.

FIG. 8 shows an example of a screen display of a guide guiding the presentation of the biometric site to the front camera 15 of the authentication terminal 100 of Embodiment 1 in step S100.

In the explanation of the operation method (S100), an image 19 showing an example of the presentation of a biometric part and a message 20 showing how to present the biometric part are displayed on the display 4, mainly to indicate which biometric part of the operator is to be presented at which position on the authentication terminal 100. The content of the message 20 may also be read out by the speaker 8.

Figure 9:
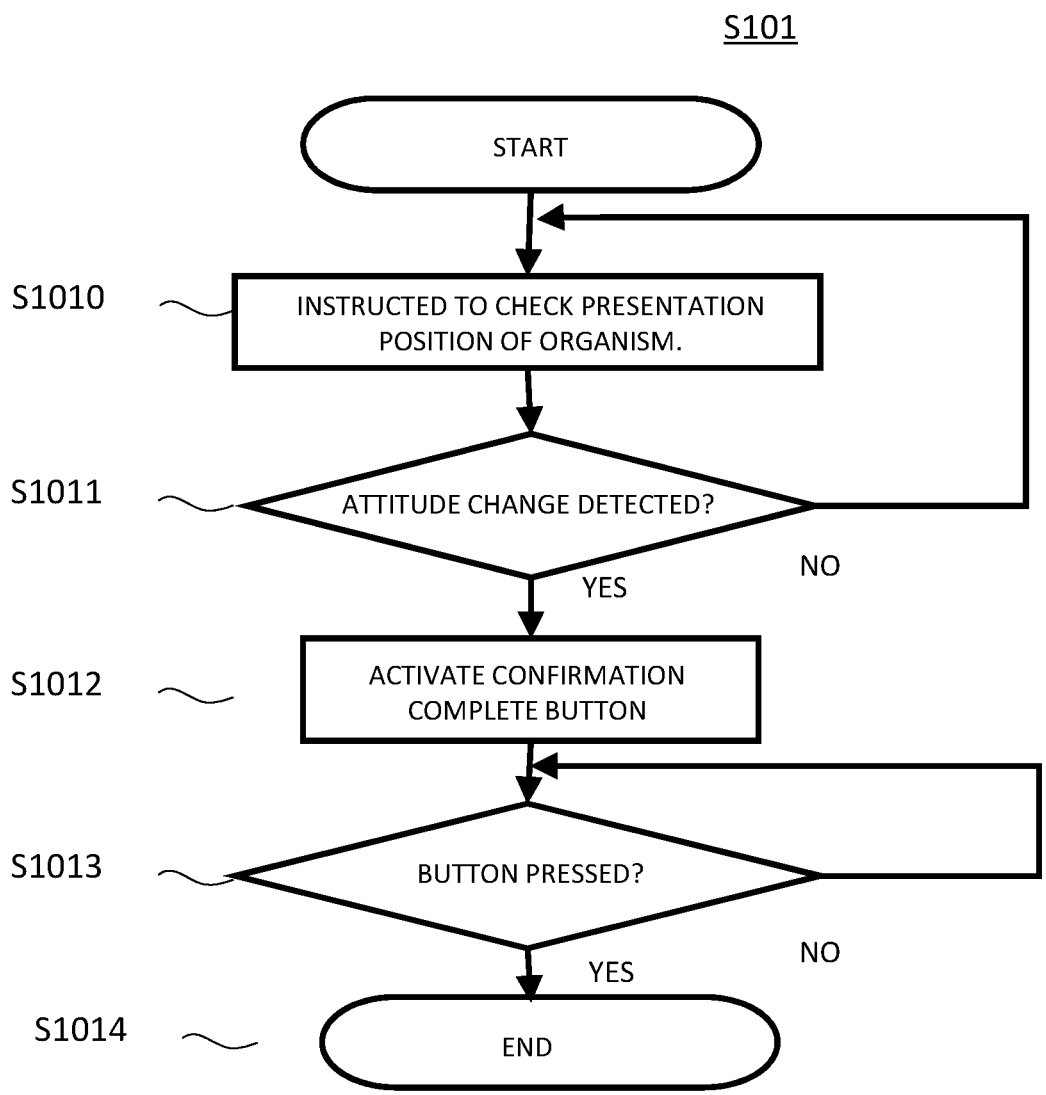
FIG. 9 is a flowchart showing the process of S101, the confirmation decision of the operation description in Embodiment 1.

FIG. 9 is a flowchart showing the S101 process of the confirmation judgment of the operation description of the authentication terminal 100 in Embodiment 1. The process shown in FIG. 9 is processed by the control of authentication processing unit 2.

Figure 10:
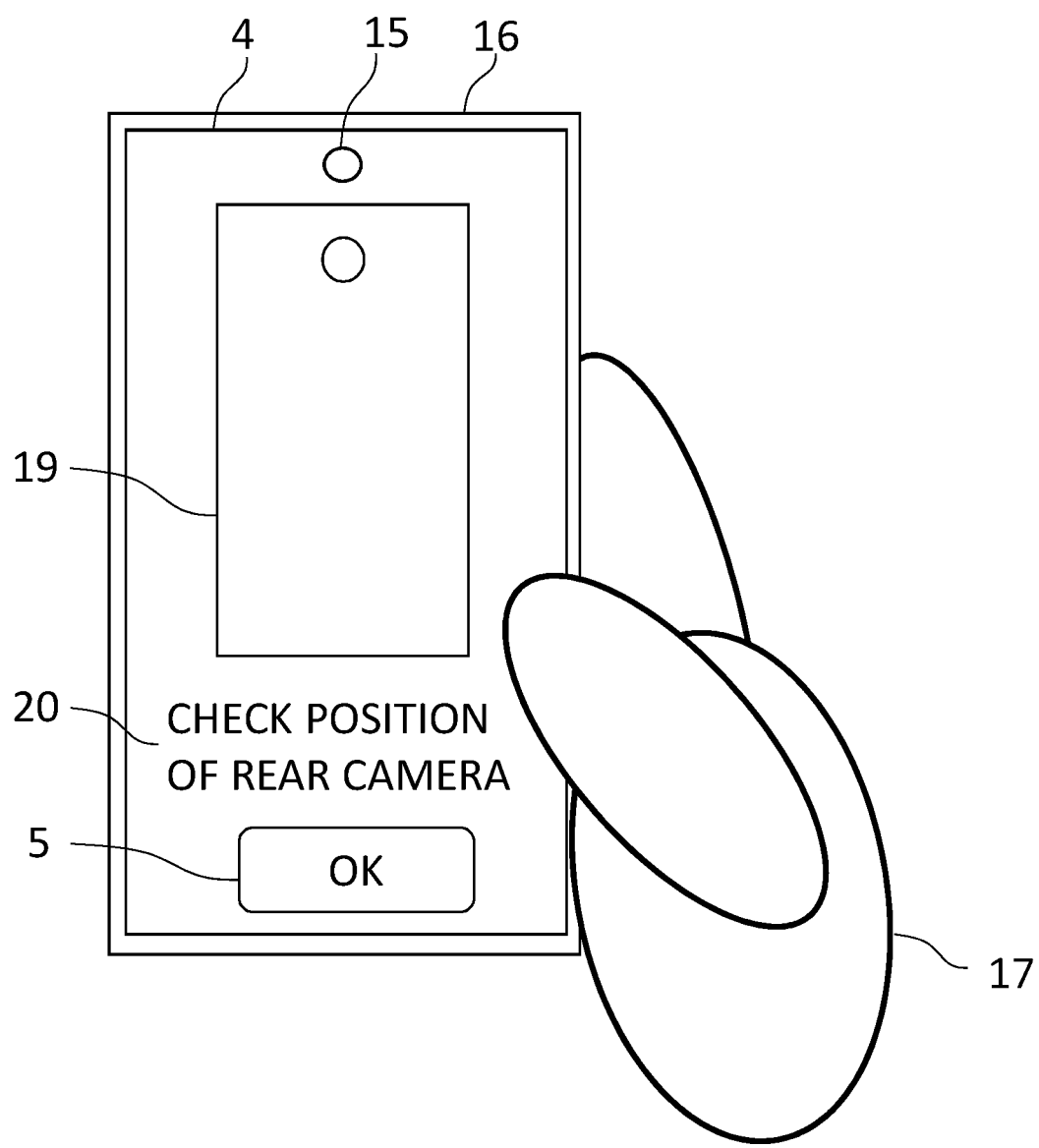
FIG. 10 shows an example of the screen display in S101, the confirmation decision of the work description in Embodiment 1.

FIG. 10 shows an example of a screen display in S101, the confirmation judgment of the operation description of the authentication terminal 100 in Embodiment 1.

Figure 11:
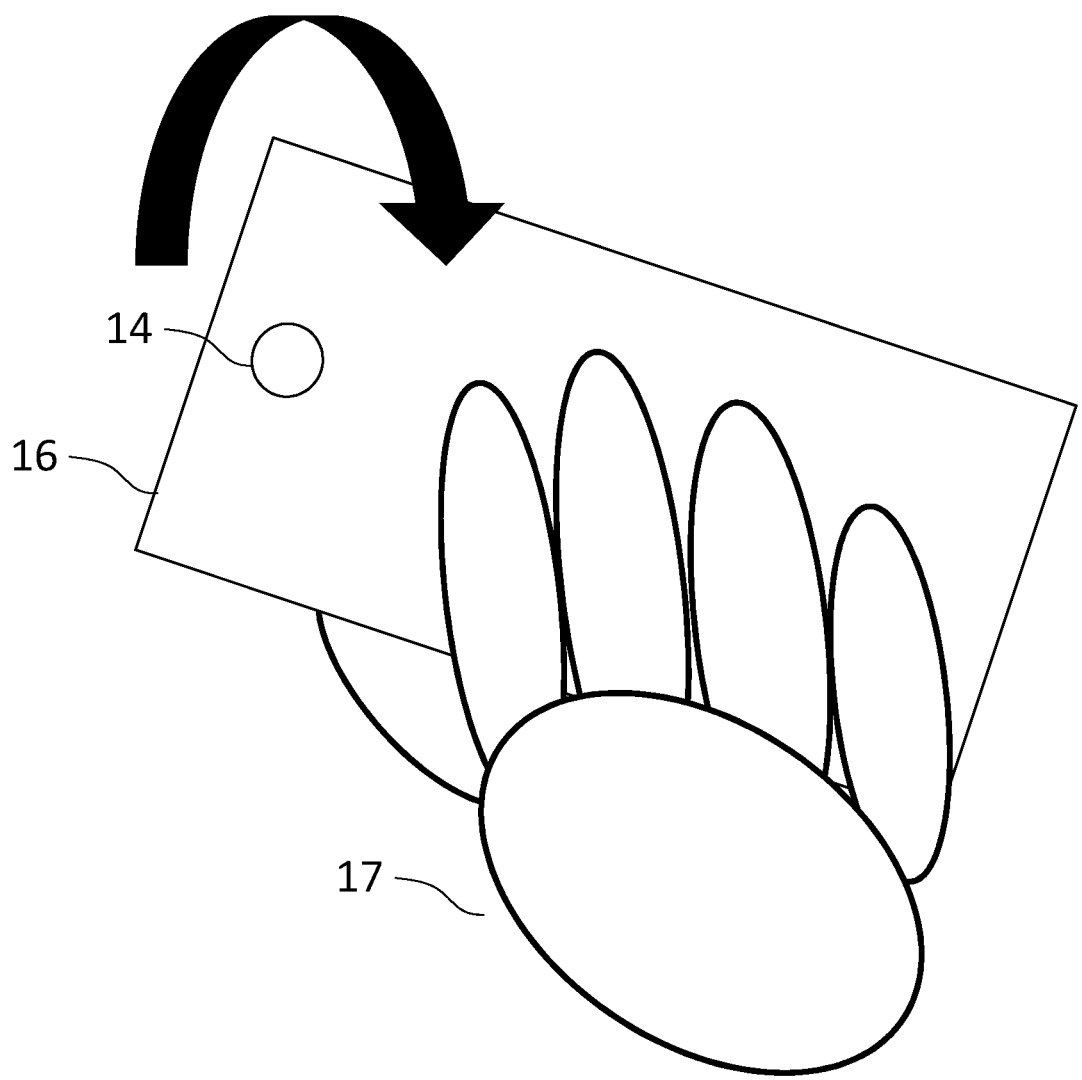
FIG. 11 shows an example of the operation of the authentication terminal in the confirmation decision S101 of the operation description in Embodiment 1.

FIG. 11 shows an example of the operation of the authentication terminal in the confirmation judgment S101 of the operation description of the authentication terminal 100 in Embodiment 1.

The confirmation judgment of the operation explanation (S101) is a process to ensure that the operator of the authentication terminal confirms the operation method explained by the authentication terminal 100, and an example of the details of the process is described below, using FIG. 9.

First, the authentication terminal 100 instructs the operator of the authentication terminal to confirm the presentation position of the biometric part to the authentication terminal by displaying on display 4 (S1010). For example, as shown in FIG. 10, display 4 displays an image 19 showing the back of the authentication terminal 100, a message 20 indicating that the camera position is to be confirmed, and a button 5 to notify the authentication terminal 100 that the operator has completed confirmation. Until the operator complies with the contents of message 20, button 5 is inactive and cannot be pressed.

Next, the authentication terminal 100 detects changes in the posture of the authentication terminal 100 with the posture detector 6 (S1011). For example, by detecting the rotation generated by turning the terminal over as shown in FIG. 11, the authentication terminal 100 can know that the operator has confirmed the position of the rear camera 14 located on the back of the authentication terminal 100. The fact that the operator has confirmed the presentation position of the biometric part by detecting the posture change of the authentication terminal 100 may be explicitly indicated to the operator, such as by displaying it on the display 4. If the posture change is sufficiently small, the instruction to confirm the presentation position of the biological body (S1010) is performed again. If a change in posture is detected, the authentication terminal 100 activates the button 5 so that it can be pressed (S1012).

Next, the authentication terminal 100 checks whether button 5 has been pressed (S1013). If it has not been pressed, it waits until it is pressed. If it is pressed, it assumes that the terminal operator has finished confirming the explanation of the operation method and terminates the process (S1014).

Figure 12:
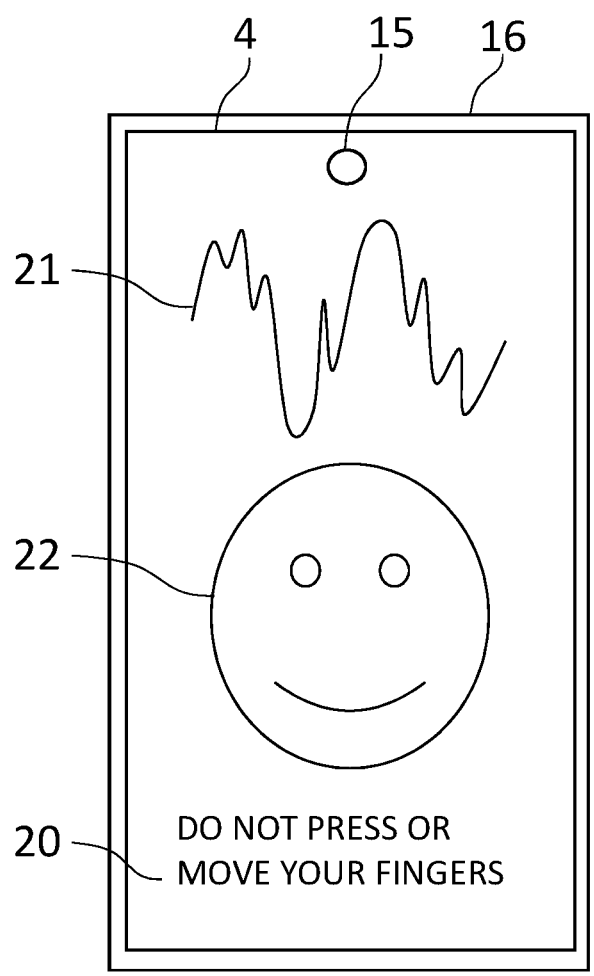
FIG. 12 shows an example of the screen display in S102, the instruction for the presentation posture in Embodiment 1.

FIG. 12 shows an example of the screen display in S102, the instruction for the presentation posture in Embodiment 1.

Figure 13:
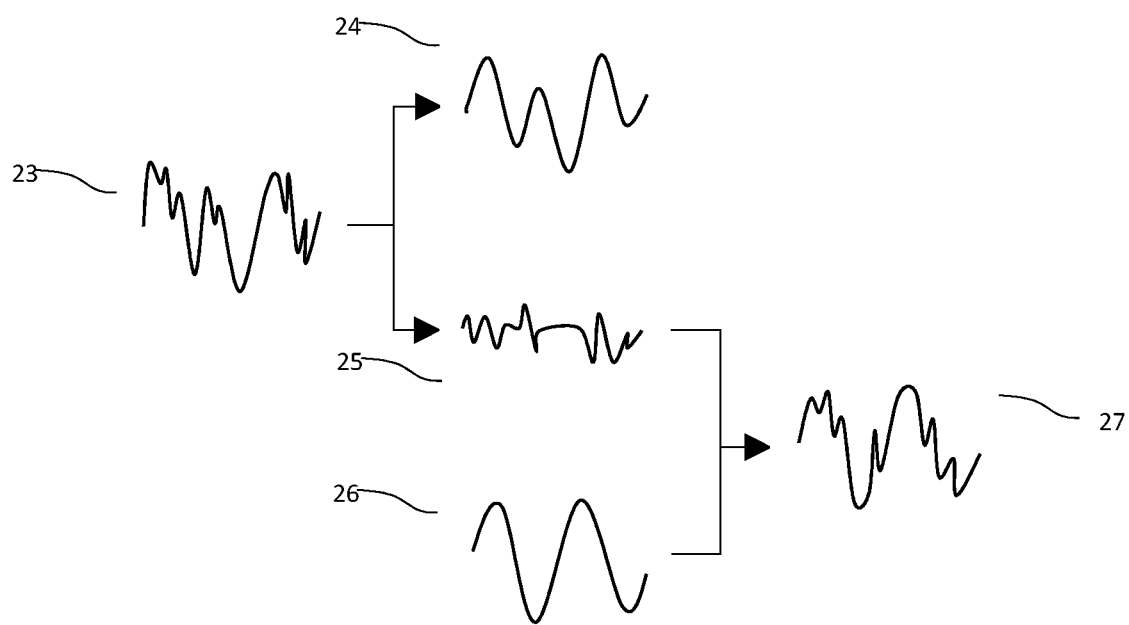
FIG. 13 shows how the vital information to be displayed in the presentation posture instruction S102 is generated in Embodiment 1.

FIG. 13 shows how the vital information displayed in the S102 instruction for the presentation posture is generated in Embodiment 1.

The presentation posture instruction (S102) in FIG. 5 is a process for detecting impersonation with high accuracy and for implementing biometric authentication, and an example of the details of the process is described below.

Authentication terminal 100 captures finger 17 of the operator with rear camera 14 and extracts vital information A from the video obtained by the method described below or other methods. The vital information A is, for example, a pulse wave, heart rate, and time-continuous signals correlated therewith. The extracted vital information A23 is displayed on the display 4, for example, as a waveform image 21 (see FIG. 12) representing a waveform with time on the horizontal axis and signal intensity on the vertical axis, together with an image 22 showing a face captured by the front camera 15. At this time, false vital information 26 that has different amplitude, period, phase, and other characteristics from the extracted vital information A23 may be displayed instead as the waveform image 21. This is because the extracted vital information A23 is used to confirm whether the operator of the authentication terminal 100 and the person to be authenticated are the same person by the method described below and displaying the extracted vital information A23 as it is may lead to an increased security risk.

As shown in FIG. 13, the extracted vital information A23 can be separated into signal component 24 and noise component 25, and by adding the noise component 25 to the fake vital information 26, fake vital information 27 containing noise and disturbance can be generated and displayed instead as a waveform image 21. This is because the degree of noise and disturbance in the extracted vital information A23 will be notified to the operator, and the finger presentation posture can be improved by displaying a message 20 together with the finger presentation method to weaken the disturbance. This is expected to reduce some of the noise components 25 such as noise and disturbance contained in the extracted vital information A23, which will make the impersonation detection described below more accurate. Here, the absolute value of the difference between the extracted vital information A23 and its time average is used as the noise component 25 in the extracted vital information A23, which can be obtained simply.

Figure 14:
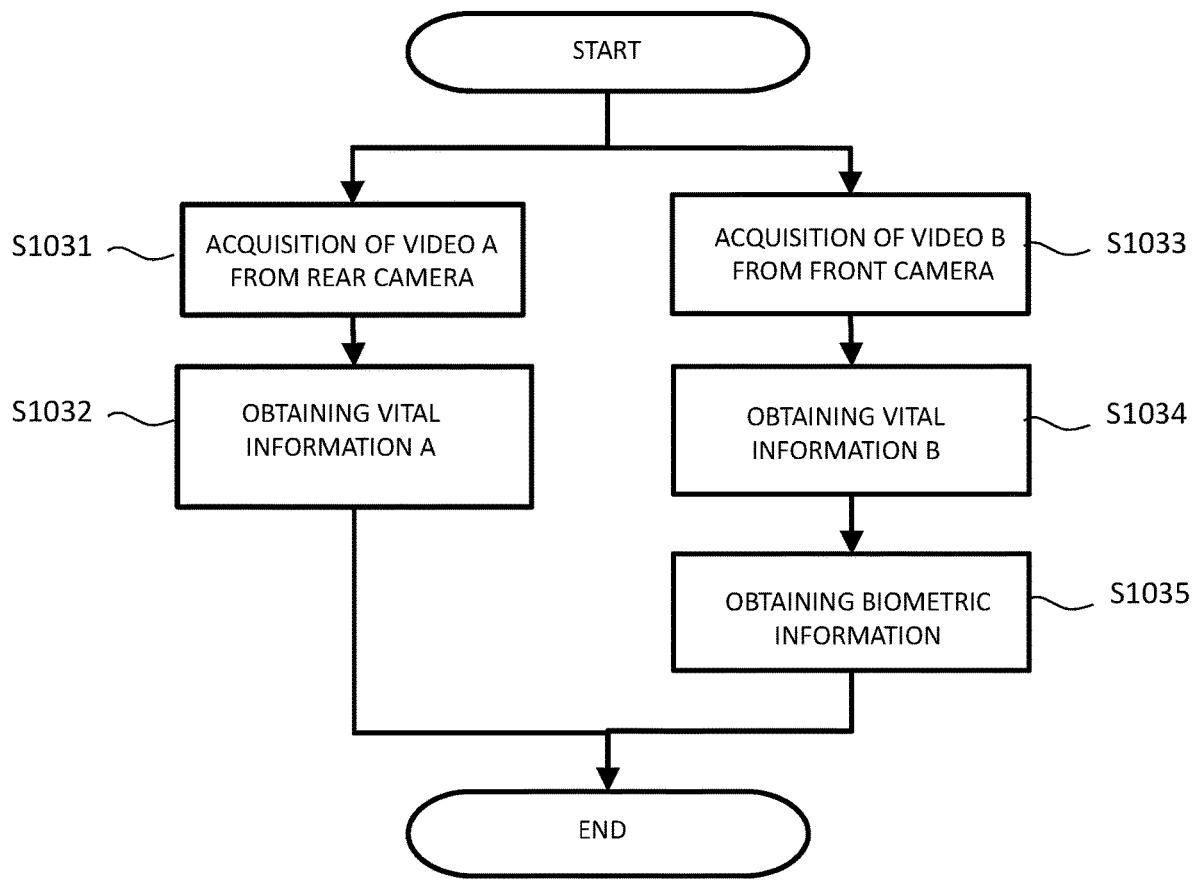
FIG. 14 is a flowchart showing the process of S103 for obtaining biometric and vital information in Embodiment 1.

FIG. 14 is a flowchart showing the process of S103 for obtaining vital and biometric authentication information by the authentication terminal 100 in Embodiment 1. The process shown in FIG. 14 is processed by the control of authentication processing unit 2.

In the acquisition of vital and biometric authentication information (S103), the rear camera 14 and the front camera 15 capture the fingers 17 and face 18 of the operator grasping the terminal, respectively. Vital information A is obtained from video A obtained by capturing 17 fingers, and vital information B and biometric authentication information are obtained from video B obtained by capturing 18 faces. Since vital information B and biometric authentication information are acquired from the same data respectively, when it is verified that vital information A and B originate from the same person by the method described below, it can be confirmed that biometric authentication information is extracted from the biometric site presented by the true operator who has not been impersonated. By acquiring video A and video B simultaneously and extracting vital information A and B, the influence of temporal changes in vital information such as pulse wave and heart rate can be reduced. An example of the details of the process is described below.

First, the authentication terminal 100 takes a picture of finger 17 in contact with the first camera, the rear camera 14, to acquire video A (S1031). By photographing the finger 17 with the belly of the finger 17 in contact with the lens of the rear camera 14, the changes in blood flow that accompany the pulsation of the heart can be captured as changes in the brightness of the image. If there is a light-emitting device, e.g., a torch, near the rear camera 14, the image may be captured while turning it on. This allows the light emitted from the light-emitting device to scatter through the finger, improving the visibility of the blood vessels by the rear camera 14 and allowing higher definition measurement of the changes in blood flow rate at the fingertip.

Next, the authentication terminal 100 acquires vital information A from the video A acquired from the rear camera 14 and stores it in memory 10 (S1032). For example, the luminance signal in one dimension in the time direction, which is the average value in the spatial direction of the luminance of each image per unit time that constitutes the moving image A, may be used as the vital information A. When the image comprising Video A is an RGB image, the signal value of a green (G) pixel, which has a higher S/N ratio with a larger number of pixels in the photosensors than red (R) and blue (B), may be used as the luminance of that pixel. Or the RGB image may be converted to another color space such as YUV or HSV, and the luminance signal such as Y for YUV or V for HSV may be used as the luminance. Or the average of the R, G, and B pixel values of each pixel may be used as the luminance of that pixel. As with the fingertip blood flow, the luminance signal of the vital information A obtained above repeats periodically, becoming larger and smaller. To reduce the effect of this disturbance, the average value of the luminance signal over a certain time interval in the vital information A, which is a time-continuous luminance signal, may be obtained and that value may be used as the vital information A.

Next, the authentication terminal 100 uses the second camera, the front camera 15, to capture the face 18 presented on the front camera 15 and acquire the video B (S1033). Vital information B is acquired from the video B and stored in memory 10 (S1034). Thereafter, the position and size of face 18 are detected from video B using an arbitrary face detection algorithm, and the respective feature values, etc. are acquired as biometric authentication information and stored in memory 10 (S1035). The acquisition of biometric authentication information may be performed simultaneously with the acquisition of video A (S1031) and vital information A (S1032) from the rear camera 14, and especially with the acquisition of video A from the rear camera 14 and authentication processing unit 2, front camera 15 and if there are constraints on the maximum data transfer volume between authentication processing unit 2 or the processing capacity of CPU 9, they may be carried out sequentially.

To acquire the vital information B, the area occupied by the skin is extracted from the face 18 detected by an arbitrary skin area extraction algorithm, the average luminance in the spatial direction is calculated for each of the three channels (R, G, and B) from the extracted skin area, and the pulse wave is obtained by acquiring a time-series luminance signal. Next, a moving average filter is applied to the acquired time-series luminance signals for the three channels in the temporal direction to reduce the effect of noise.

Next, the time-series luminance signal for three channels, from which noise has been removed using ICA (Independent Component Analysis) or other techniques, is decomposed into multiple independent components that make up that signal. The components that compose the color tone of the face 18 image obtained from the front camera 15, which is mainly sensitive to visible light wavelengths, include melanin pigments in the epidermal layer of the skin, blood vessels in the dermal layer, and fat tissue in the subcutaneous tissue, etc. The above ICA technique enables the acquisition of the luminance components in which blood vessels are dominant. The acquired time series of blood vessel-dominant luminance components may be used as vital information B, for example, as the pulse wave of face 18.

Next, the authentication terminal 100 acquires biometric authentication information from the video B and vital information B acquired from the front camera 15 (S1035). For example, feature points representing the position and shape of the eyes, nose, mouth, etc., may be extracted from the images of each frame comprising the acquired video B and used as biometric authentication information, or features extracted from the face area of the images of each frame comprising the video B using Deep Learning technologies such as FaceNet, ArcFace, and BiometricFace may be used as biometric authentication information. Information such as amplitude, period, phase, and other statistics from the extracted vital information B may also be used as biometric information.

Figure 15:
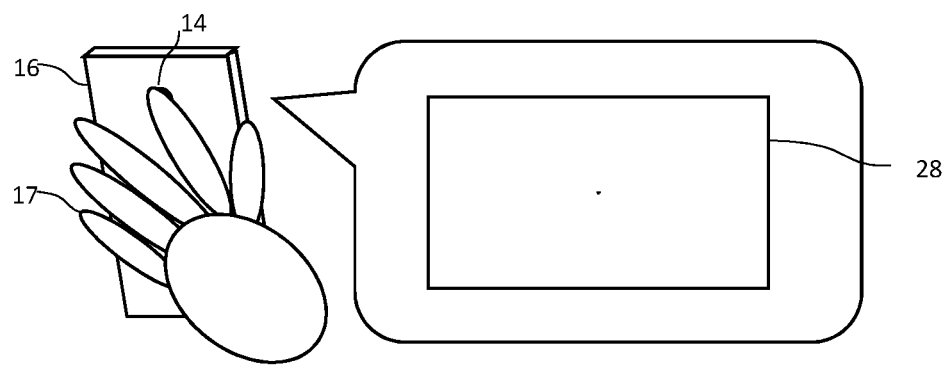
FIG. 15 shows an example of capturing images with a finger shielding the entire lens and the obtained video in S104, the quality judgment of the acquisition information in Embodiment 1.

FIG. 15 shows an example of how the authentication terminal 100 shields the entire lens with a finger in S104 for quality judgment of the data to be acquired by the authentication terminal 100 and an example of the video obtained in Embodiment 1.

Figure 16:
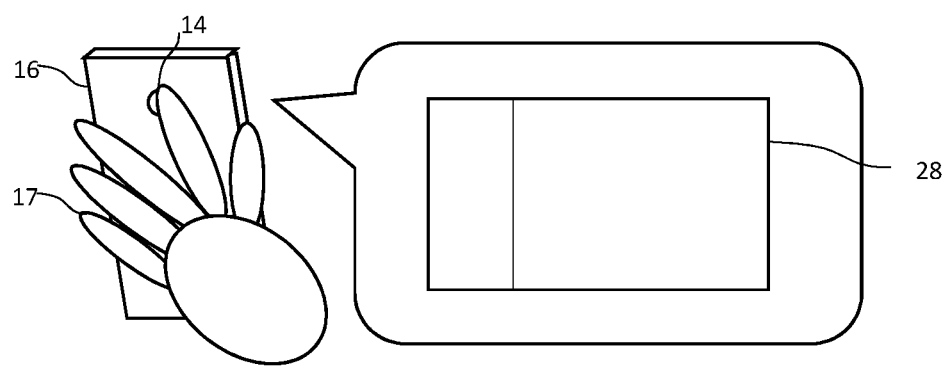
FIG. 16 shows an example of capturing images by shielding only a part of the lens with a finger in S104, the quality judgment of the acquisition information, and an example of the obtained video in the example 1.

FIG. 16 shows an example of the video obtained and how only a part of the lens of the rear camera 14 is shielded by finger 17 in S104 (see FIG. 5), which is a quality judgment of the data obtained by the authentication terminal 100 in Embodiment 1.

In the acquired information quality judgment (S104), it is determined whether the video, vital information, and biometric authentication information acquired from the rear camera 14 and front camera 15 are of appropriate quality for implementing impersonation detection and biometric authentication.

For example, as shown in FIG. 15, when finger 17 is in contact with the lens of the rear camera 14 to take a picture of finger 17, if finger 17 is correctly shielding the entire lens, the rear camera 14 produces a movie 28 in which the entire image has a reddish cast and flickers significantly over time. On the other hand, if finger 17 is shielding only a part of the lens of the rear camera 14 as shown in FIG. 16, the rear camera 14 produces a movie 28 in which only a part of the image is reddish and the blinking over time is small. In the video 28 with small blinking, the area occupied by finger 17 becomes small and the background other than the finger may also be reflected. The vital information A extracted from the video 28 with small blinking contains unnecessary information other than the blood flow rate of the fingertip, leading to a decrease in the accuracy of the spoofing detection described below. Therefore, it is possible to extract feature values related to texture, edge, color, etc. from the video 28 with small flickering, and determine whether there is reflection of objects including background other than the fingertips based on the trend of the feature values. If there is a reflection of an object, the system may return to the presentation posture instruction (S102) and instruct the operator to reposition the hand.

For vital information A, vital information B, and biometric authentication information, it may be judged whether each information can be extracted stably. For example, if Vital Information A and Vital Information B are collectively referred to as vital information, the absolute value of the difference between the vital information after noise reduction obtained by applying a moving average filter in the time direction to the vital information and the original vital information signal is integrated in the time direction. This value can be regarded as the sum of the amount of noise in the vital information. If the value is greater than a predetermined threshold value, the extracted vital information considered to be unstable and the camera may return to the presentation posture instruction (S102), perform appropriate posture guidance, and redo the shooting.

For biometric authentication information extracted from each frame of video acquired from image capture unit 1, such as rear camera 14 and front camera 15, the degree of difference of biometric authentication information between different frames is calculated. The degree of difference indicates how much the biometric authentication information has changed at each time during the recording. When the same biometric area is presented, it is desirable for the biometric authentication information to vary little over time, i.e., the biometric authentication information should be stable. Therefore, if the degree of difference is greater than a predetermined threshold value, the extracted biometric authentication information considered to be unstable, and the process may return to the presentation posture instruction (S102), perform appropriate posture guidance, and redo the shooting.

In the determination of the presence or absence of spoofing (S105), the following process may be performed, for example. First, the amplitude, period, phase, etc. are calculated for vital information A and B, which are acquired simultaneously from different biological areas, respectively. If these vital information were acquired from the same person, the difference in period corresponding to the heart rate is sufficiently small between vital information A and B. In other words, if the cycles are significantly different, the vital information A and B were collected from different persons, and there is a high possibility that the operator is impersonating the person to be authenticated for biometric authentication. In this case, the system notifies the operator of the failure of enrollment or authentication by displaying a message on the display 4, etc., and then terminates the process.

The display 4 shows an example of a presentation in which the finger 17 is pressed hard against the rear camera 14 and text instructing the user to assume a similar posture, and then the rear camera 14 is used again to capture the finger, and vital information is obtained from the resulting video.

If the finger 17 is pressed down hard, the flickering of the resulting video becomes weaker because the blood circulation in the finger deteriorates. By checking for this phenomenon, it is possible to confirm that a real finger is being presented instead of a fake finger. Furthermore, while vibrating the authentication terminal with vibrator 7, the rear camera 14 takes a picture of finger 17 to obtain a video. When vibrating, objects that are not in contact with the rear camera 14 will vibrate and appear in the video, while objects that are in contact will vibrate in synchronization with the authentication terminal, so they will appear in the resulting video without vibrating. By checking the presence or absence of this vibration, it can be confirmed that finger 17 is presented in contact with the lens of the rear camera 14 and that no fake object is presented in a non-contact manner.

Embodiment 2

Figure 17:
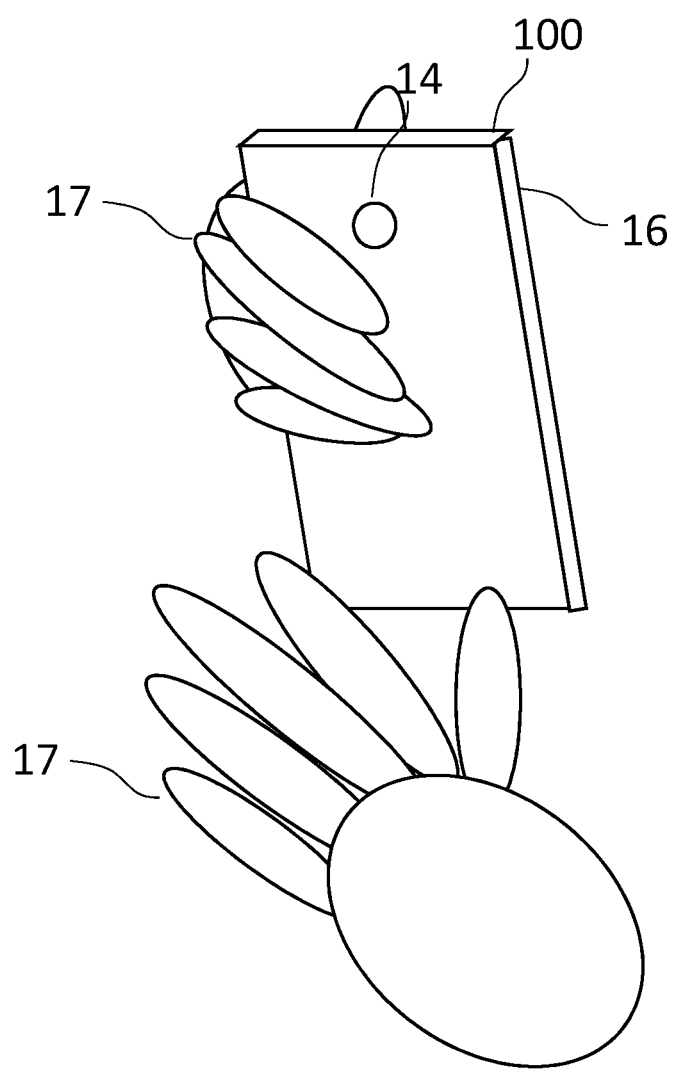
FIG. 17 shows an example of the authentication in Embodiment 2 observed from the rear side of the authentication terminal.

FIG. 17 shows an example of the authentication in Embodiment 2 observed from the rear side of the authentication terminal.

Figure 18:
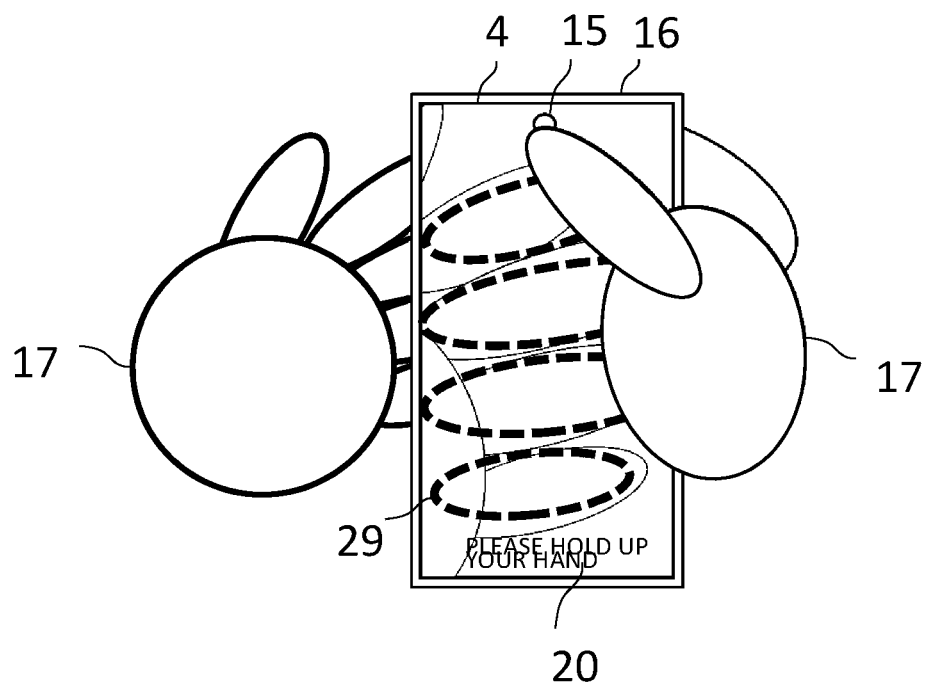
FIG. 18 shows an example of the authentication observed from the front side of the authentication terminal in Embodiment 2.

FIG. 18 shows an example of the authentication in Embodiment 2 observed from the front side of the authentication terminal.

In this embodiment, biometric authentication is performed by an authentication terminal 100 equipped with a rear camera 14, a front camera 15, and a display 4 outside the housing 16, after confirming that the operator of the terminal is the person to be authenticated, as assumed by the authentication terminal 100.

The operator of the terminal takes a picture of finger 17 by the front camera 15 located on the front of housing 16, as shown in FIG. 18, and the other finger 17 by the rear camera 14 located on the back of housing 16, as shown in FIG. 17. Vital information is extracted from the image obtained from the front camera 15, and vital and biometric authentication information is extracted from the image obtained from the rear camera 14. After confirming that the respective vital information originates from the same person, biometric authentication can be performed based on the biometric authentication information extracted from the finger 17, thereby preventing impersonation by others while performing biometric authentication.

The configuration of the authentication terminal 100 in Embodiment 2 is the same as in the first example. The processing flowchart the time of registration and authentication also has many points in common with Embodiment 1, but differs in that the finger 17 is not presented to the rear camera 14 by touching the lens, but by holding it over the camera without making contact. It also differs in that it does not present the face to the front camera 15, but presents the finger 17 holding the authentication terminal 100 by touching the lens. This makes it possible to perform biometric authentication even when biometric authentication using the face in Embodiment 1 is difficult due to the presence or absence of a mask, glasses, makeup, hair style, etc. that are different from those used when the biometric authentication is registered.

As shown in FIG. 18, when capturing finger 17 with the rear camera 14, a bill guide image 29 representing the approximate shape of the finger and a message 20 instructing the operator to present finger 17 may be displayed on display 4. This is because it is necessary to guide the operator's presentation posture in order to capture the finger with the rear camera 14 on the rear side in an operable manner, whereas the face can be captured naturally with the front camera 15 on the same side as the display 4 when the display 4 is viewed. Furthermore, the bill guide image 29 shown on the display 4 may be enlarged to show only the finger area of the finger 17. This allows the area of the finger to be captured with higher resolution than when the rear camera 14 is used to capture the entire finger 17, and is expected to improve the authentication accuracy when spatially detailed patterns such as wrinkles on the finger surface and blood vessels near the finger surface are used as biometric authentication information.

When capturing finger 17 with the front camera 15, the illumination of the display 4 may be temporarily increased. This allows light emitted from the display 4 to penetrate and scatter through finger 17, improving the visibility of blood vessels in the moving image obtained by capturing the scene with the front camera 15, and enabling highly accurate acquisition of vital information such as pulse wave and heart rate.

Embodiment 3

Figure 19:
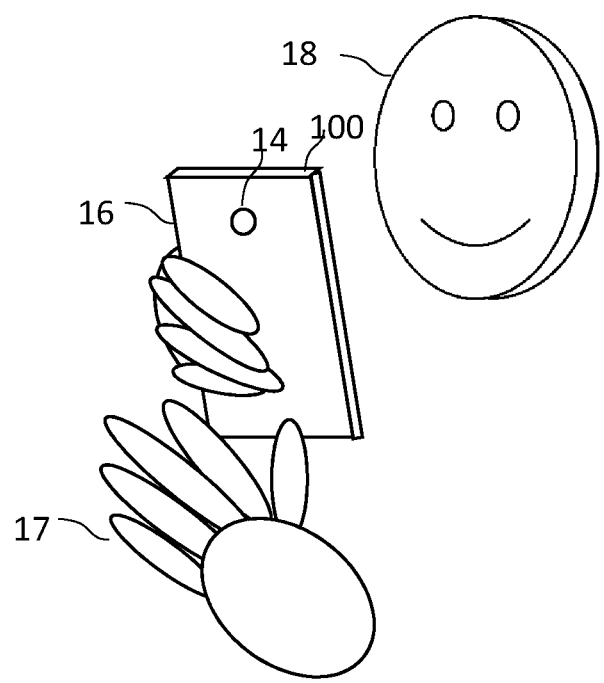
FIG. 19 shows an example of the authentication observed from the rear side of the authentication terminal in Embodiment 3.

FIG. 19 shows an example of the authentication in Embodiment 3 observed from the rear side of the authentication terminal.

Figure 20:
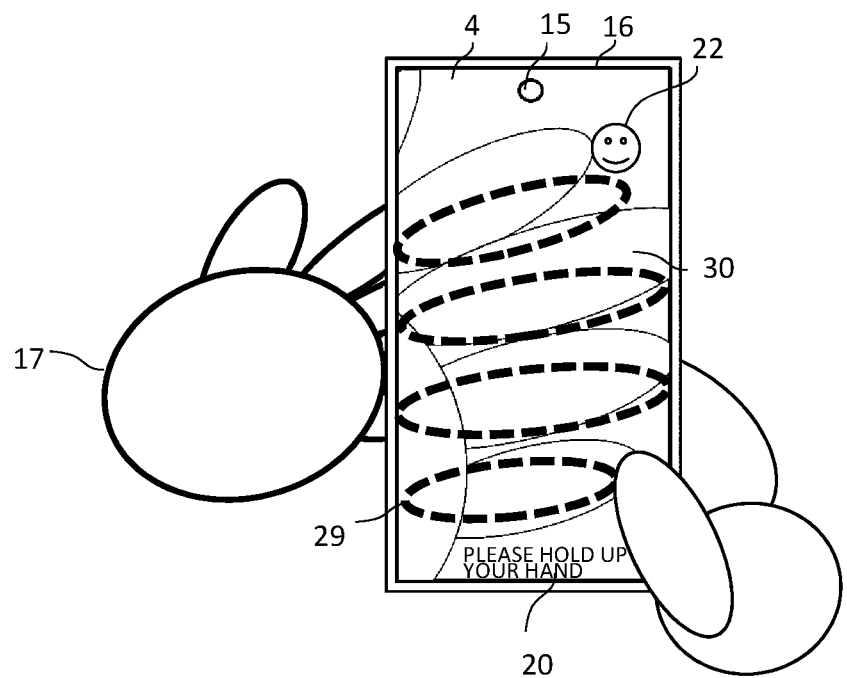
FIG. 20 shows an example of the authentication observed from the front side of the authentication terminal in Embodiment 3.

FIG. 20 shows an example of the authentication in Embodiment 3 observed from the front side of the authentication terminal.

In Embodiment 3, biometric authentication is performed using an authentication terminal 100 equipped with a rear camera 14, front camera 15, and display 4 outside housing 16, after confirming that the terminal operator is the person to be authenticated as envisioned by the biometric authentication system. The terminal operator takes a picture of face 18 with front camera 15 and takes a picture of finger 17 with rear camera 14. Vital and biometric authentication information is extracted from the image obtained from the front camera 15, and vital and biometric authentication information is extracted from the image obtained from the rear camera 14. After confirming that the respective vital information originates from the same person, biometric authentication can be performed based on the biometric authentication information extracted from face 18 and finger 17, thereby preventing impersonation by others while performing biometric authentication.

The configuration of the authentication terminal 100 in Embodiment 3 is the same as in Embodiment 1. The processing flowchart of the time of registration and authentication also has many points in common with Embodiment 1, but the difference is that the hand is not presented to the rear camera 14 by touching the lens with the finger, but by holding the camera over the finger without touching it. The difference is that not only vital information, but also biometric authentication information is extracted from the biometric part presented to the rear camera 14. As a result, by combining the biometric authentication information extracted from face 18 and finger 17, biometric authentication can be performed with higher accuracy than when biometric authentication is performed on face 18 alone or finger 17 alone.

When combining biometric authentication information extracted from face 18 and finger 17 to perform enrollment or authentication processes, the biometric authentication information may be combined with the face photograph on an official identification card, such as a driver's license or national identification (ID) card. For example, when enrolling biometric authentication information in some system, to check whether the person with personal information such as name, date of birth, and address entered in the system is the same person as the person who entered the information, the personal information entered in the system may be checked against the personal information on the official identification card, and the system can be registered by linking the system's registration information with the person's facial information by matching the face of the person photographed with the camera that was activated at the time of system registration with the face photograph on the official identification card. If, at the same time, other body parts, such as fingers, are also photographed, and if it is possible to confirm, based on the vital information obtained, that the face and the body parts belong to the same person, it will be possible to link information on body parts other than the face to the system's registration information. This allows biometric authentication with biometric areas other than the face, for example, when logging into the system, thereby increasing convenience.

In the case where face 18 and finger 17 are captured simultaneously, for example, the image 22 showing face 18 obtained by the front camera 15 during the capture and the image 30 showing finger 17 obtained by the rear camera may be displayed on display 4. If the biological site is more difficult to present for finger 17, which needs to be presented to the rear camera 14 by making full use of the bill guide image 29, than for face 18, which can be captured naturally by the front camera 15 by looking at the display 4, the reflected image 22 of face 18 by displaying a larger image 30 of finger 17 on the display 4 than the image 22 of face 18, the operator can present finger 17 more easily.

Embodiment 4

Figure 21:
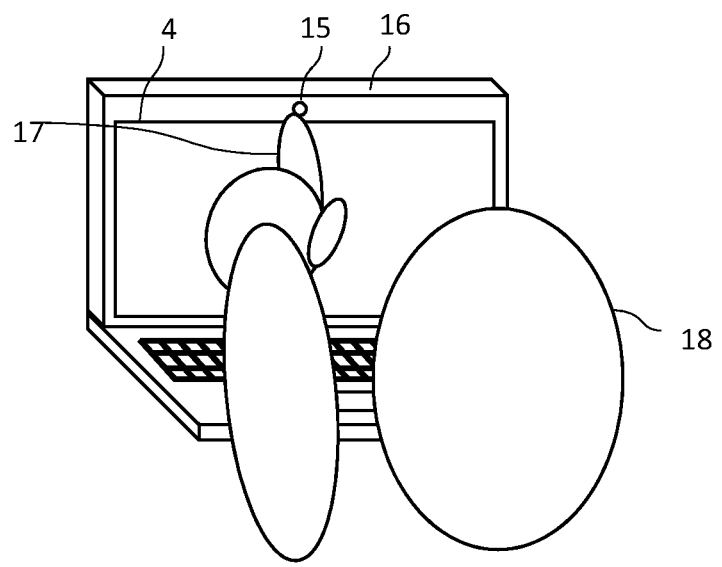
FIG. 21 shows an example an authentication in Embodiment 4.

FIG. 21 shows an example of the authentication in Embodiment 4.

In Embodiment 4, unlike the first, second, and third examples, image capture unit 1 consists of one front camera 15. In this case, one biological part, e.g., finger 17 in contact with the lens of the front camera 15, is captured and vital information A is extracted from the obtained video. Then, the other biological part, e.g., face 18, is photographed and the vital information B and biometric authentication information are extracted from the obtained video. The identity of the vital information A and B obtained in a way that is difficult for anyone other than the operator to present is confirmed, and biometric authentication is performed based on the biometric authentication information extracted from the video from which the vital information B was derived. This allows the operator to be authenticated by biometric authentication while preventing impersonation by others, even when image capture unit 1 consists of a single camera.

The invention is not limited to the above examples but includes various variations. For example, the above examples are described in detail for better understanding of the invention and are not necessarily limited to those with all the described configurations.

In addition, each of the above compositions, functions, processing units, processing means, etc. may be realized in hardware by designing some or all of them, for example, in an integrated circuit. In addition, each of the above compositions, functions, etc. may be realized in software by a processor interpreting and executing a program that realizes the respective function. Information such as programs, tables, files, etc. that realize each function may be stored in a storage device such as a nonvolatile semiconductor memory, hard disk drive, SSD (Solid State Drive), or a computer-readable non-transient data storage medium such as an IC card, SD card, DVD, etc.

The control and information lines are those considered necessary for illustrative purposes, and not all control and information lines are necessarily shown in the product. In reality, almost all components may be considered to be interconnected.

REFERENCE SIGNS LIST

1 Image capture unit
2 Authentication Processing Unit
3 Memory
4 Display
5 Input Unit
6 Posture Detector
7 Vibrator
8 Audio Output Unit
9 CPU
10 Memory
11 IF
12 Authentication Unit
13 Registration Unit
14 Rear camera
15 Front camera
16 Housing
17 Finger
18 Face
19 Image showing how to operate the biometric system
20 Message
21 Vital information to be displayed
22 Image captured by the front camera
23 Extracted vital information
24 Signal component of the extracted vital information
25 Noise component of the extracted vital information
26 Dammy vital information
27 Dammy vital information with noise component added
28 Animation obtained by capturing a hand in contact with the lens
29 Hand guide image
30 Image captured by the rear camera CLAIMS

The invention claimed is:
1. A system that prevents fraudulent access of a device by a user using biometric authentication, the system comprising:
a first camera that acquires a first image data of a first biological area of the user;
a second camera that acquires a second image data of a second biological area of the user, wherein the first image data and the second image data are acquired during a predetermined period of time,
a display that displays a location guidance of the first biological area and the second biological area to the user, wherein the location guidance instructs the user to place the first biological area within a viewing area of the first camera and second biological area within a viewing area of the second camera,
a memory that stores biometric authentication information of the user in advance, and
an processor that is communicatively coupled to the memory, the first camera, the second camera and the display,
wherein the processor is configured to:
extract a first vital information and a second vital information from the first image data and the second image data,
determine an identity of the user based on the first vital information and the second vital information, when the identity of the user is confirmed:
extract a biometric information of the user from the second image data,
perform a biometric authentication based on the extracted biometric information and the biometric information stored in the memory,
grant the user access to the device when the biometric authentication is successful, and
deny the user access to the device the biometric authentication is unsuccessful.

2. The system according to claim 1, wherein the first image data and the second image data are acquired simultaneously by the first camera and the second camera.

3. The system according to claim 1, wherein:
the first vital information is a pulse wave derived from the first image data, and
the second vital information is a pulse wave derived from the second image data.

4. The system according to claim 1, further comprising a sensor that detects changes in a posture of the device; and
wherein the processor is further configured to:
change content on the display based on the posture.

5. The system according to claim 1, wherein the first biological area is finger of the user; and
wherein processor is further configured to:
determine that the finger is in contact with the first camera.

6. The system according to claim 5, wherein the processor is further configured to:
control the display to display position guidance at a position where the finger is pressed against the first camera.

7. The system according to claim 5, further comprising:
a vibrator that causes vibration to the first camera, and
wherein the processor is further configured to:
cause the first camera to acquire the first image data when the finger is vibrated by the vibrator.

8. The system according to claim 1, wherein
the second biological area is an area including a face of the user.

9. A method for preventing fraudulent access of a device by a user using biometric authentication, the method comprising:
acquiring, using a first camera, a first image data of a first biological area of the user;
acquiring, using a second camera, a second image data of a second biological area of the user, wherein the first image data and the second image data are acquired during a predetermined period of time,
displaying a location guidance of the first biological area and the second biological area to the user, wherein the location guidance instructs the user to place the first biological area within a viewing area of the first camera and second biological area within a viewing area of the second camera,
extracting a first vital information and a second vital information from the first image data and the second image data,
determining an identity of the user based on the first vital information and the second vital information,
when the identity of the user is confirmed:
extracting a biometric information of the user from the second image data,
performing a biometric authentication based on the extracted biometric information and the biometric information stored in a memory prior to the acquiring of the first image data and the second image data,
granting the user access to the device when the biometric authentication is successful, and
denying the user access to the device when the biometric authentication is unsuccessful.

10. A non-transitory computer readable medium storing instruction for preventing fraudulent access of a device by a user using biometric authentication, the instructions when executed by a processor of the device, cause the device to perform a method comprising:
acquiring, using a first camera, a first image data of a first biological area of the user;
acquiring, using a second camera, a second image data of a second biological area of the user, wherein the first image data and the second image data are acquired during a predetermined period of time,
displaying a location guidance of the first biological area and the second biological area to the user, wherein the location guidance instructs the user to place the first biological area within a viewing area of the first camera and second biological area within a viewing area of the second camera,
extracting a first vital information and a second vital information from the first image data and the second image data,
determining an identity of the user based on the first vital information and the second vital information, when the identity of the user is confirmed:
extracting a biometric information of the user from the second image data,
performing a biometric authentication based on the extracted biometric information and the biometric information stored in a memory prior to the acquiring of the first image data and the second image data,
granting the user access to the device when the biometric authentication is successful, and
denying the user access to the device when the biometric authentication is unsuccessful.

11. The non-transitory computer readable storage medium according to claim 10, wherein
the first image data and the second image data are acquired simultaneously.

* * * * *